(12) United States Patent
Son

(10) Patent No.: US 9,060,199 B2
(45) Date of Patent: Jun. 16, 2015

(54) BROADCAST RECEIVING DEVICE AND METHOD FOR RECEIVING BROADCAST THEREOF

(75) Inventor: Tae-yong Son, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 13/402,157

(22) Filed: Feb. 22, 2012

(65) Prior Publication Data

US 2013/0002951 A1 Jan. 3, 2013

(30) Foreign Application Priority Data

Jun. 29, 2011 (KR) ........................ 10-2011-0063975

(51) Int. Cl.
*H04N 21/4363* (2011.01)
*H04N 21/426* (2011.01)

(52) U.S. Cl.
CPC ... *H04N 21/43632* (2013.01); *H04N 21/42607* (2013.01)

(58) Field of Classification Search
USPC .......................................... 348/725, 500, 836
See application file for complete search history.

(56) References Cited

U.S. PATENT DOCUMENTS

| | | | | |
|---|---|---|---|---|
| 6,097,441 A * | 8/2000 | Allport | ......................... | 348/552 |
| 6,105,083 A * | 8/2000 | Kurtze et al. | .................... | 710/29 |
| 6,263,503 B1 * | 7/2001 | Margulis | ........................ | 725/81 |
| 6,311,268 B1 * | 10/2001 | Chu | ................................. | 713/1 |
| 6,636,526 B1 * | 10/2003 | Nyu | .............................. | 370/445 |
| 6,975,844 B2 * | 12/2005 | Obitsu | ....................... | 455/193.1 |
| 7,254,190 B2 * | 8/2007 | Kwentus et al. | ............... | 375/340 |
| 7,334,132 B1 * | 2/2008 | Kumar et al. | ................. | 713/189 |
| 7,440,702 B2 * | 10/2008 | Imai | .............................. | 398/141 |
| 7,523,241 B2 * | 4/2009 | Konishi | ........................ | 710/302 |
| 7,825,931 B2 * | 11/2010 | Mawatari et al. | ............. | 345/501 |
| 7,831,988 B2 * | 11/2010 | Ishida | ............................ | 725/46 |
| 7,932,957 B2 * | 4/2011 | Azuma et al. | ................. | 348/725 |
| 8,144,266 B2 * | 3/2012 | Dawson | ....................... | 348/836 |
| 8,401,497 B2 * | 3/2013 | Rofougaran | .................... | 455/83 |
| 2005/0097451 A1 * | 5/2005 | Cormack et al. | ............. | 715/512 |
| 2006/0174032 A1 * | 8/2006 | Winchester et al. | .......... | 709/238 |
| 2006/0236354 A1 * | 10/2006 | Sutardja | ....................... | 725/100 |
| 2007/0089144 A1 * | 4/2007 | Du Breuil et al. | ............. | 725/81 |
| 2007/0216814 A1 * | 9/2007 | Azuma | ......................... | 348/646 |
| 2007/0220571 A1 * | 9/2007 | Feng et al. | .................... | 725/111 |
| 2008/0090610 A1 * | 4/2008 | Wang et al. | ................. | 455/556.2 |
| 2009/0128452 A1 * | 5/2009 | Bril et al. | ........................ | 345/55 |
| 2010/0037282 A1 * | 2/2010 | Iwata et al. | .................... | 725/131 |
| 2010/0077443 A1 * | 3/2010 | Wang | ............................ | 725/153 |
| 2010/0238360 A1 * | 9/2010 | Lee | ................................ | 348/731 |
| 2011/0053491 A1 * | 3/2011 | Bolton et al. | ................ | 455/3.06 |
| 2011/0216930 A1 * | 9/2011 | Kobayashi | .................... | 381/332 |
| 2012/0270603 A1 * | 10/2012 | Wang et al. | .................... | 455/558 |
| 2012/0290885 A1 * | 11/2012 | Mobin et al. | .................... | 714/56 |

\* cited by examiner

*Primary Examiner* — Brian Yenke

(74) *Attorney, Agent, or Firm* — Sughrue Mion, PLLC

(57) ABSTRACT

A broadcast receiving device and a method for receiving a broadcast thereof are provided. The broadcast receiving device includes a channel receiving unit which receives a channel broadcasting signal, generates a first parallel signal from the received channel broadcasting signal, converts the parallel signal into a serial signal, and outputs the serial signal; and a main body unit which receives the serial signal output from the channel receiving unit, reconverts the received serial signal into a second parallel signal, processes the second parallel signal, and outputs a video signal, an audio signal, and an additional data signal extracted from the processed second parallel signal. Since the channel receiving unit is provided as a separate unit from the main body unit, the thickness of the broadcast receiving device can be further reduced.

13 Claims, 3 Drawing Sheets

BROADCAST RECEIVING DEVICE AND METHOD FOR RECEIVING BROADCAST THEREOF

CROSS-REFERENCE TO RELATED APPLICATIONS

This application claims priority from Korean Patent Application No. 10-2011-0063975, filed on Jun. 29, 2011, in the Korean Intellectual Property Office, the disclosure of which is incorporated herein by reference in its entirety.

BACKGROUND

1. Field

Methods and apparatuses consistent with exemplary embodiments relate generally to a broadcast receiving device and a method for receiving a broadcast thereof, and more particularly, to a broadcast receiving device and a method for receiving a broadcast thereof, which can process a broadcast signal that is received from an external source and provide the processed broadcast signal to a user.

2. Description of the Related Art

A digital broadcast receiving device in the related art is provided with all constituent elements that are required to receive a broadcast, such as a channel receiving section, a signal processing section, a control section, and the like, which are included in one unit. That is, the constituent elements, such as the channel receiving section, the signal processing section, the control section, and the like, are mounted on one or plural printed circuit boards (PCBs), and the one or plural PCBs are included in one unit.

However, if all the constituent elements that are required to receive the broadcast are included in one unit in the digital broadcast receiving device in the related art, two problems occur as follows.

First, according to the recent tendency of a digital broadcast receiving device, the thickness thereof has become thinner. However, no matter how slim a display device becomes, inclusion of all the constituent elements of the broadcast receiving device in one unit will limit the slimness of the digital broadcast receiving device.

Second, in the case of installing a thin and light-weight digital broadcast receiving device as a wall mount type device, an RF cable that is required to receive the broadcast should be installed, and this may cause restrictions in installing the device.

SUMMARY

One or more exemplary embodiments may overcome the above disadvantages and other disadvantages not described above. However, it is understood that one or more exemplary embodiment are not required to overcome the disadvantages described above, and may not overcome any of the problems described above. Accordingly, an aspect of one or more exemplary embodiments provides a broadcast receiving device and a method for receiving a broadcast thereof, which can transmit a broadcast data signal from a channel receiving section, which is arranged in a separate unit from a main body unit of the receiver, to the main body unit using a serial-parallel converter.

According to one aspect of an exemplary embodiment, a broadcast receiving device includes a channel receiving unit which receives a channel broadcasting signal, generates a first parallel signal from the received channel broadcasting signal, converts the first parallel signal into a serial signal, and outputs the serial signal; and a main body unit which receives the serial signal output from the channel receiving unit, reconverts the received serial signal into a second parallel signal, processes the second parallel signal, and outputs a video signal, an audio signal, and an additional data signal extracted from the processed second parallel signal.

The channel receiving unit may include a channel receiving section which processes the channel broadcasting signal and generates the first parallel signal; and a first serial-parallel converter which converts the first parallel signal into the serial signal and outputs the serial signal to the main body unit.

The first serial-parallel converter may convert the serial signal into a differential signal and may output the differential signal to the main body unit, and the main body unit may reconvert the received differential signal into a second parallel signal.

Further, the first serial-parallel converter may further include a a Phase-Locked Loop which generates a clock signal that is synchronized with the channel broadcasting signal having a predetermined frequency.

Further, the first serial-parallel converter may embed the clock signal into the serial signal and may output the serial signal embedded with the clock signal to the main body unit.

Further, the first serial-parallel converter may output the clock signal to the main body unit through a separate channel from a channel that outputs the serial signal.

The main body unit may include a second serial-parallel converter which receives the serial signal output from the first serial-parallel converter and reconverts the received serial signal into the second parallel signal; and a signal processing section which processes the second parallel signal converted by the second serial-parallel converter and outputs the video signal, the audio signal, and the additional data signal.

The broadcasting signal may include a data signal, a start signal which reports a start of a transport stream, and a valid signal which reports a valid time period of data.

The broadcast receiving device may be a wall mountable TV.

According to another aspect of an exemplary embodiment, a method for receiving a broadcast for a broadcast receiving device includes, by a channel receiving unit of the broadcast receiving device: receiving a channel broadcasting signal; generating a first parallel signal from the received channel broadcasting unit; converting the first parallel signal into a serial signal; and outputting the serial signal to a main body of the broadcast receiving device; and, by a main body of the broadcast receiving device: receiving the serial signal from the channel receiving unit and reconverting the received serial signal into a second parallel signal; processing the second parallel signal; and outputting a video signal, an audio signal, and an additional data signal extracted from the processed second parallel signal.

The step of converting the parallel signal into the serial signal and the step of outputting the serial signal to the main body may include converting the serial signal into a differential signal and outputting the differential signal to the main body unit.

Further, the step of converting the parallel signal into the serial signal and outputting the serial signal to the main body may further include generating a clock signal that is synchronized with the broadcast signal having a predetermined frequency.

Further, the step of converting the parallel signal into the serial signal and outputting the serial signal to the main body may include embedding the clock signal into the serial signal and outputting the serial signal embedded with the clock signal to the main body unit.

Further, the step of converting the parallel signal into the serial signal and outputting the serial signal to the main body may include outputting the clock signal to the main body unit through a separate channel from a channel that outputs the serial signal.

The broadcasting signal may include a data signal, a start signal which reports a start of a transport stream, and a valid signal which reports a valid time period of data.

BRIEF DESCRIPTION OF THE DRAWINGS

The above and/or other aspects will be more apparent by describing in detail exemplary embodiments, with reference to the accompanying drawings, in which.

DETAILED DESCRIPTION

Hereinafter, exemplary embodiments are described in detail with reference to the accompanying drawings. However, the present disclosure is not restricted or limited to such exemplary embodiments. For reference, in explaining the present disclosure, well-known functions or constructions will not be described in detail so as to avoid obscuring the description with unnecessary detail.

The term "section" as used herein means a hardware component, such as a processor or circuit, and/or a software component that is executed by a hardware component such as a processor.

Figure 1:
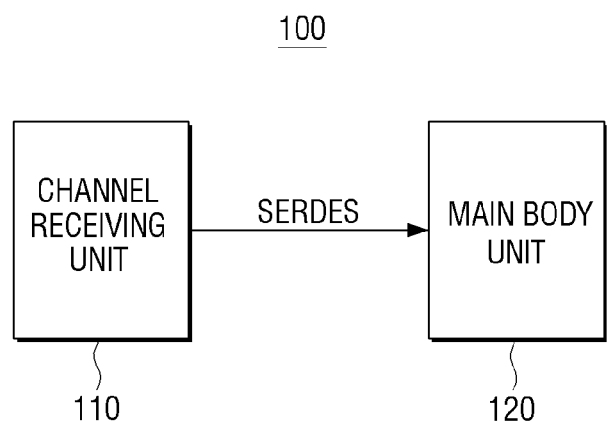
FIG. 1 is a block diagram schematically illustrating the configuration of a digital broadcast receiving device according to an exemplary embodiment.

FIG. 1 is a block diagram schematically illustrating the configuration of a digital broadcast receiving device 100 according to an exemplary embodiment. As illustrated in FIG. 1, the broadcast receiving device 100 includes a channel receiving unit 110 and a main body unit 120. In this case, the broadcast receiving device 100 may be implemented by a device having a channel receiving section such as a digital TV, and particularly, by a wall mount TV.

The channel receiving unit 110 is a separate unit that is apart from the main body unit 120, and receives a broadcasting signal that is transmitted by wire or wirelessly from an external source to output the received broadcasting signal to the main body unit 120.

In particular, the channel receiving unit 110 receives the broadcasting signal of a broadcasting channel, generates a parallel signal, and converts the generated parallel signal into a serial signal using a serializer to output the converted serial signal to the main body unit 120. In this case, the broadcasting signal includes a data signal, a start signal which reports a start of a transport stream, and a valid signal which reports a valid time period of data.

In particular, the serializer converts the serial signal into a differential signal in (+) and (−) forms to output the differential signal. This is to perform a long-distance transmission of a high-frequency signal such as the serial signal.

Further, the channel receiving unit 110 can generate a clock signal that is synchronized with the broadcasting signal. In this case, the clock signal may be embedded into the serial signal that is converted by the serializer to be output to the main body unit 120, or may be output to the main body unit 120 using a separate channel.

The main body unit 120 includes a configuration for driving the broadcast receiving device 100 except for the channel receiving unit 110. For example, the main body unit 120 may include a signal processing section, a control section, and an output section (for example, a display section and a speaker section).

In particular, the main body unit 120 receives the serial signal output from the channel receiving unit 110, reconverts the received serial signal into a parallel signal, and processes the reconverted parallel signal to output at least one signal of the video signal, the audio signal, and the additional data signal to the output section.

Specifically, the main body unit 120 reconverts the serial signal output from the serializer into a parallel signal using a deserializer. Further, the main body unit 120 performs the signal process using the reconverted parallel signal, and outputs the video signal, the audio signal, and the additional data signal through an output section such as a display section or a speaker section.

As described above, since the channel receiving unit is provided separately from the main body unit 120 and the broadcasting signal is transmitted from the external channel receiving unit 110 to the main body unit 120 using a serializer-deserializer (SERDES), the thickness of the broadcast receiving device 100 can be further reduced.

Hereinafter, referring to FIGS. 2 and 3, the channel receiving unit 110 and the main body unit 120 will be described in more detail.

Figure 2:
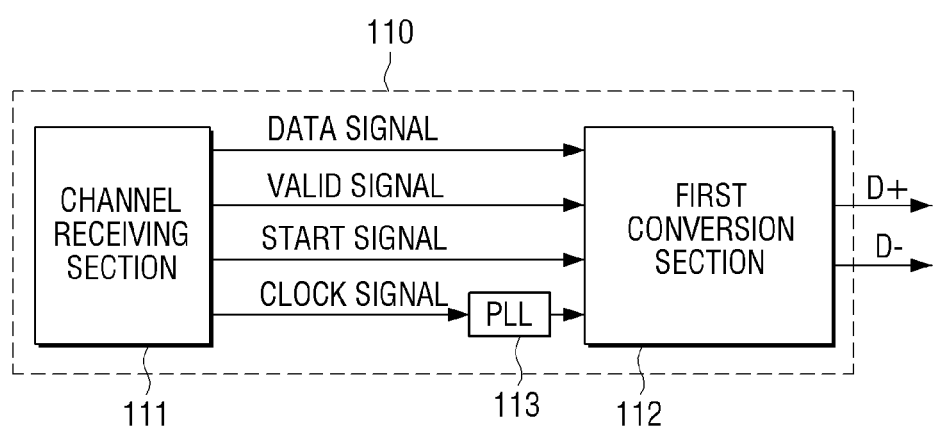
FIG. 2 is a block diagram illustrating the configuration of a channel receiving unit of a digital broadcast receiving device according to an exemplary embodiment.

FIG. 2 is a block diagram illustrating the configuration of a channel receiving unit 110 of a digital broadcast receiving device according to an exemplary embodiment. As illustrated in FIG. 2, the channel receiving unit 110 includes a channel receiving section 111 and a first serial-parallel conversion section 112.

The channel receiving section 111 receives broadcasting signals input by wire or wirelessly from diverse external sources, and outputs a parallel signal. In this case, the channel receiving section 111 may include at least one of a tuner which selects one channel from plural broadcasting channels, a demodulator which converts a received RF signal into an IF signal and outputs the IF signal in the form of a transport stream, and a channel decoder which prevents a channel transport error.

Specifically, the channel receiving section 111 selects one broadcasting signal from the plural broadcasting signals received from the external source and outputs a parallel signal. In this case, the broadcasting signal includes an 8-bit data signal, a valid signal which reports a valid time period of data, a start signal which reports a start of a transport stream, and a clock signal, and thus is composed of 11 bits in total. In particular, among the output signals of the channel receiving section 111, the valid signal and the start signal are allocated as parallel signals, and the clock signal is allocated as a clock signal for transmitting the transport stream through a phase-locked loop (PLL) provided inside the first serial-parallel conversion unit 112.

However, in the case of a serial mode, according to the type of the channel receiving section 111 used, the data signal may be composed of one bit. In this case, the clock speed may correspond to 8 times the frequency in comparison to the parallel mode.

The first serial-parallel conversion section 112 includes a serializer which converts the parallel signal transmitted from the channel receiving section 111 into a serial signal in order to output the converted serial signal to the main body unit 120, and a phase-locked loop (PLL) which generates the clock signal. In this case, the first serial-parallel conversion section 112 can generate the serial signal by embedding the clock signal into the parallel signal.

However, this is merely exemplary, and the clock signal may be transmitted using a separate channel from the serial signal according to the type of the serial-parallel converter used.

Further, the first serial-parallel conversion section 112 may convert the serial signal into a differential signal in (+) and (−) forms for long-distance transmission of the serial signal and output the differential signal D+ and D− to the main body unit 120.

As illustrated in FIG. 2, the channel receiving unit 110, which is separately provided on the outside of the main body unit 120, converts the parallel signal into the serial signal to output the converted serial signal, and thus long-distance transmission of the broadcasting data becomes possible without error even if the channel receiving unit 110 is on the outside.

Figure 3:
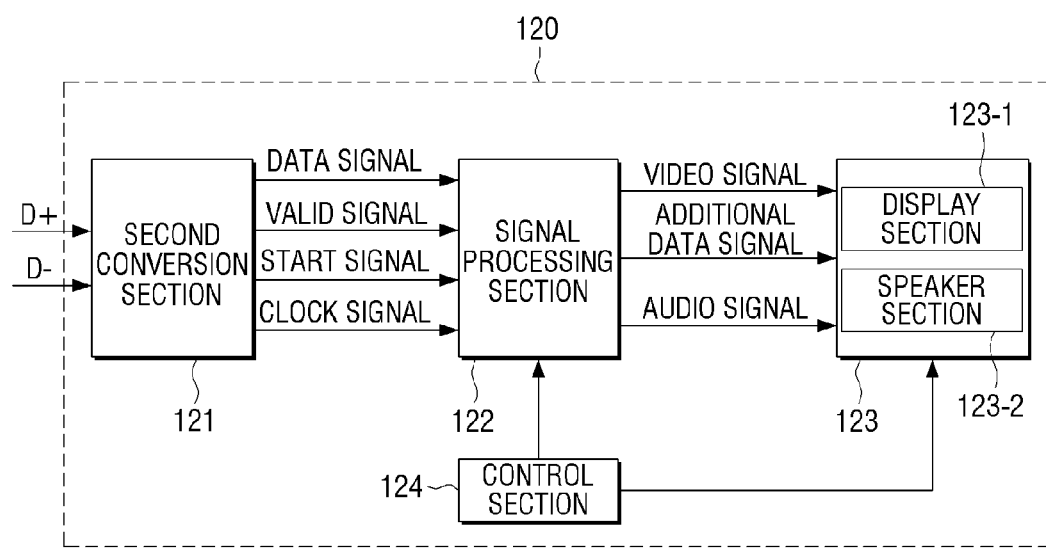
FIG. 3 is a block diagram illustrating the configuration of a main body unit of a digital broadcast receiving device according to an exemplary embodiment.

FIG. 3 is a block diagram illustrating the configuration of a main body unit 120 of a digital broadcast receiving device according to an exemplary embodiment. As illustrated in FIG. 3, the main body unit 120 includes a second serial-parallel conversion section 121, a signal processing section 122, an output section 123, and a control section 124.

The second serial-parallel conversion section 121 receives the serial signal output from the first serial-parallel conversion section 112 of the channel receiving unit 110 and reconverts the received serial signal into a parallel signal to output the reconverted parallel signal to the signal processing section 122. The second serial-parallel conversion section 121 includes a deserializer which reconverts the serial signal in the form of a differential signal output from the first serial-parallel conversion section 112 into a parallel signal, and a phase-locked loop (PLL) which generates the clock signal.

In particular, the deserializer reconverts the input serial signal into a 8-bit signal, a valid signal, a start signal, and a clock signal, which is similar or equivalent to the parallel signal before being input to the first serial-parallel conversion section 112, and outputs the reconverted parallel signal to the signal processing section 122.

The signal processing section 122 performs a signal process on the input parallel signal under the control of the control unit 124. In this case, the signal processing section 122 may include a demultiplexer which demultiplexes the parallel signal into a video signal, an audio signal, and an additional data signal, an MPEG-2 decoder which processes the demultiplexed video signal, and an AC-3 decoder which processes the demultiplexed audio signal.

Specifically, the signal processing section 122 separates the input parallel signal into the video signal, the audio signal, and the additional data signal through multiplexing. The separated video signal is processed by the MPEG-2 decoder, and the separated audio signal is processed by the AC-3 decoder. Further, the signal processing section 122 outputs the processed video signal, audio signal, and additional data signal to the output section 123.

The output section 123 outputs the video signal, the audio signal, and the additional data signal output from the signal processing section 122 to a user. In this case, the output section 123 may include a display section 123-1 which outputs the video signal or the additional data signal, and a speaker section 124-1 which outputs the audio signal.

The control section 124 receives a user command and controls the overall operation of the broadcast receiving device 100. In particular, the control section 124 controls the signal processing section 122 and the output section 123 to provide the broadcast received from the external source to the user.

In this case, the control section 124 may be implemented by a central processing unit (CPU).

As described above, since the broadcasting signal is transmitted from the channel receiving unit 100 separately provided from the main body unit 120 to the main body unit 120 using the serializer-deserializer (SERDES), the thickness of the broadcast receiving device 100 can be further reduced.

Hereinafter, referring to FIG. 4, a method for receiving a broadcast for a broadcast receiving device 100 will be described.

Figure 4:
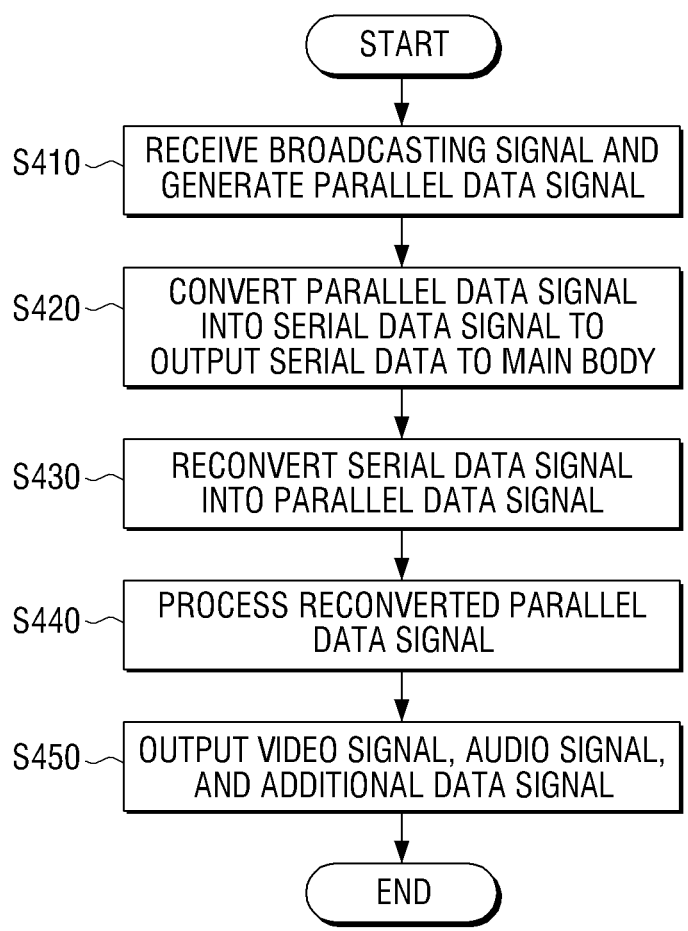
FIG. 4 is a flowchart illustrating a method for receiving a broadcast for a digital broadcast receiving device according to an exemplary embodiment.

FIG. 4 is a flowchart illustrating a method for receiving a broadcast for a digital broadcast receiving device 100 according to an exemplary embodiment.

First, the channel receiving unit 110 of the broadcast receiving device 100 receives by wire or wirelessly broadcasting signals input from broadcasting stations. Then, the channel receiving unit 110 generates a parallel signal using the broadcasting signal that is selected among the plural broadcasting signals by the tuner (S410). In this case, the parallel signal includes a data signal, a start signal which reports a start of a transport stream, a valid signal which reports a valid time period of data, and a clock signal for synchronization.

Then, the channel receiving unit 110 converts the parallel signal into the serial signal and outputs the converted serial signal to the main body unit 120 (S420). Specifically, the channel receiving unit 110 may convert the parallel signal including the data signal, the start signal, the valid signal, and the clock signal into the serial signal. In this case, the serial signal may be a differential signal in (+) and (−) forms for long-distance transmission.

However, although it is exemplified that the clock signal is embedded into the serial signal in the above-described exemplary embodiment, this is merely exemplary, and the clock signal may be transmitted to the main body unit 120 separately from the serial signal through another channel.

If the serial signal is transmitted from the channel receiving unit 110 to the main body unit 120, the main body unit 120 reconverts the received serial signal into the parallel signal (S430). Specifically, the main body unit 120 reconverts the received serial signal into the parallel signal including the data signal, the start signal, the valid signal, and the clock signal.

Further, the main body unit 120 processes the reconverted parallel signal (S440). Specifically, the main body unit 120 demultiplexes the reconverted parallel signal into the video signal, the audio signal, and the additional data signal. The demultiplexed video signal is transmitted to the MPEG-2 decoder, and the demultiplexed audio signal is transmitted to the AC-3 decoder to be processed.

Further, the main body unit 120 provides the received broadcast to the user through outputting of the processed video signal, audio signal, and additional data signal (S450). Specifically, the main body unit 120 can display the processed video signal or additional data signal and output the processed audio signal through the speaker.

As described above, since the channel receiving unit 100 is provided separately from the main body unit 120, the thickness of the broadcast receiving device 100 can be further reduced.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A digital television comprising:
   a channel receiving unit, the channel receiving unit comprising:
      a tuner configured to receive a broadcasting signal, select a broadcasting channel from the broadcasting signal, and generate a first parallel signal from the broadcasting channel; and
      a parallel-serial converter configured to generate a clock signal synchronized with the broadcasting signal, convert the first parallel signal and the clock signal into a serial signal, convert the serial signal into a differential signal, and output the differential signal; and
   a main body unit, the main body unit comprising:
      a serial-parallel converter configured to receive the differential signal, convert the differential signal into a second parallel signal comprising a video signal of the broadcasting signal, an audio signal of the broadcasting signal, and the clock signal, and output the second parallel signal;
      a demultiplexer configured to demultiplex the second parallel signal into the video signal, the audio signal, and the clock signal;
      a decoder configured to decode the demultiplexed video signal and the demultiplexed audio signal based on the demultiplexed clock signal;
      a display configured to output the demultiplexed video signal; and
      a speaker configured to output the demultiplexed audio signal,
   wherein the channel receiving unit is provided physically separated from the main body unit.

2. The digital television as claimed in claim 1, wherein the parallel-serial converter comprises a Phase-Locked Loop configured to generate the clock signal that is synchronized with the channel broadcasting signal having a predetermined frequency.

3. The digital television as claimed in claim 2, wherein the parallel-serial converter is further configured to embed the clock signal into the serial signal and output the differential signal embedded with the clock signal.

4. The digital television as claimed in claim 2, wherein the parallel-serial converter is further configured to output the clock signal to the serial-parallel converter arranged in the main body unit through a channel separate from a channel of the serial signal.

5. The digital television as claimed in claim 1, wherein the broadcasting signal comprises a data signal, a start signal which reports a start of a transport stream, and a valid signal which reports a valid time period of data.

6. The digital television as claimed in claim 1, wherein the digital television is a wall mountable digital television, and
   wherein the channel receiving unit is provided separately outside of the wall mountable digital television.

7. The digital television as claimed in claim 1, wherein the first parallel signal is equivalent to the second parallel signal.

8. The digital television as claimed in claim 1, wherein the main body unit does not include any tuner.

9. A method of a digital television processing a broadcasting signal, the method comprising:
   receiving the broadcasting signal, selecting a broadcasting channel from the broadcasting signal, and generating a first parallel signal from the broadcasting channel comprising a video signal of the broadcasting channel and an audio signal of the broadcasting channel, by a tuner arranged in a channel receiving unit of the digital television;
   generating a clock signal synchronized with the broadcasting signal, converting the first parallel signal and the clock signal into a serial signal, converting the serial signal into a differential signal, and outputting the differential signal from the channel receiving uni to a main body unit of the digital television provided separately from the channel receiving unit, by a parallel-serial converter arranged in the channel receiving unit of the digital television;
   receiving the differential signal and converting the differential signal into a second parallel signal comprising the video signal of the broadcasting channel, the audio signal of the broadcasting channel, and the clock signal, and output the second parallel signal, by a serial-parallel converter arranged in the main body unit of the digital television;
   demultiplexing the second parallel signal into the video signal, the audio signal, and the clock signal, by a demultiplexer arranged in the main body unit of the digital television;
   decoding the demultiplexed video signal and the demultiplexed audio signal based on the demultiplexed clock signal, by a decoder arranged in the main body unit of the digital television; and
   outputting video of the demultiplexed video signal by a display arranged in the main body unit of the digital television and audio of the demultiplexed audio signal by a speaker the digital television.

10. The method as claimed in claim 9, wherein the parallel-serial converter comprises a Phase-Locked Loop configured to generate the a clock signal that is synchronized with the channel broadcasting signal having a predetermined frequency.

11. The method as claimed in claim 10, wherein converting the serial signal into the differential signal comprises embedding the clock signal into the serial signal, and
   wherein the outputting the differential signal comprises outputting the differential signal embedded with the clock signal from the channel receiving unit to the main body unit.

12. The method as claimed in claim 10, wherein the outputting the differential signal comprises outputting the clock signal from the channel receiving unit to the main body unit through a channel separate from a channel of the serial signal.

13. The method as claimed in claim 9, wherein the broadcasting signal includes a data signal, a start signal which reports a start of a transport stream, and a valid signal which reports a valid time period of data.

* * * * *